H. H. BOENKER.
AGRICULTURAL IMPLEMENT.
APPLICATION FILED JUNE 9, 1908.

970,783.

Patented Sept. 20, 1910.
5 SHEETS—SHEET 1.

Witnesses

Inventor
Henry H. Boenker
By
Attorney

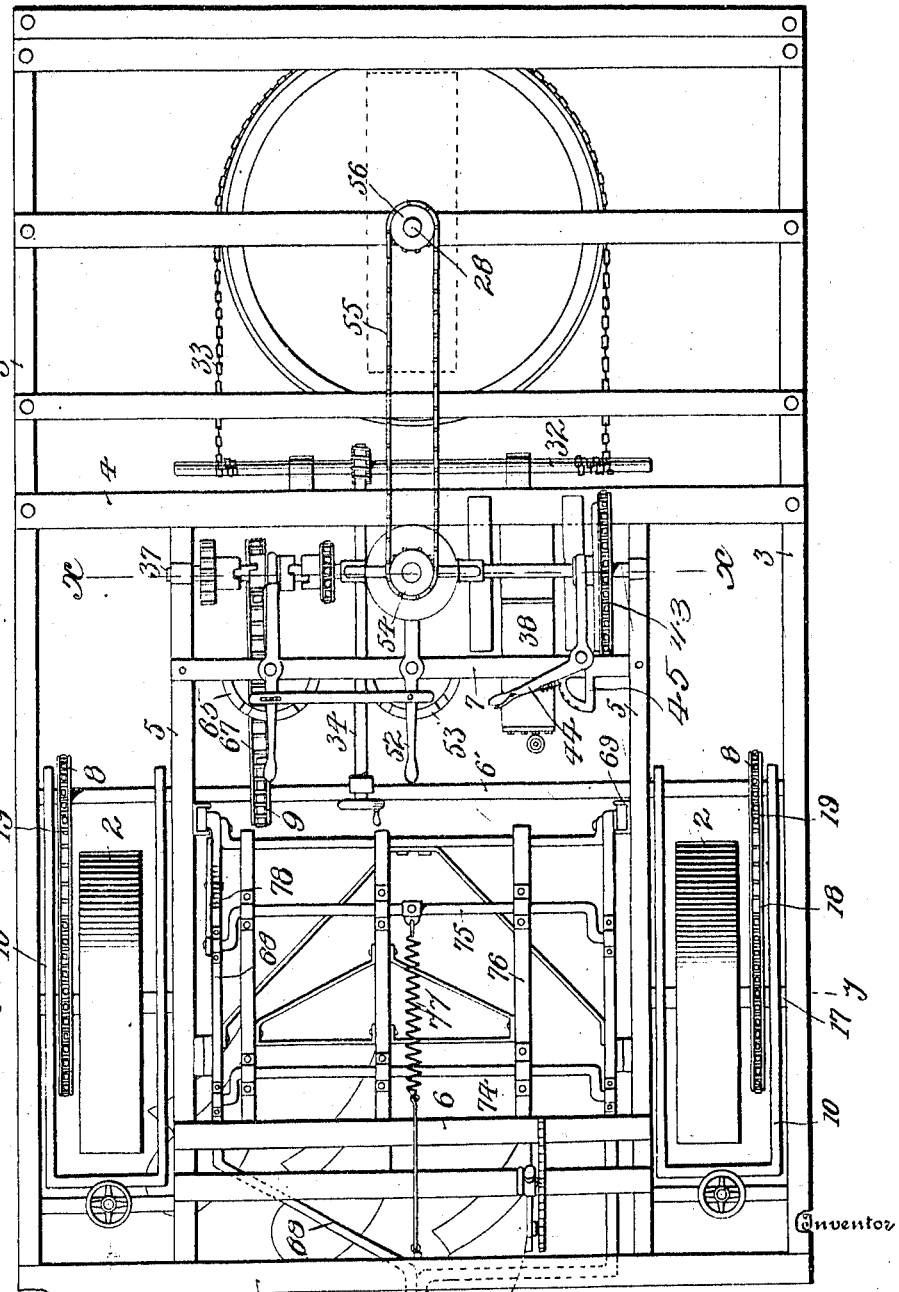

H. H. BOENKER.
AGRICULTURAL IMPLEMENT.
APPLICATION FILED JUNE 9, 1908.
970,783.
Patented Sept. 20, 1910.
5 SHEETS—SHEET 3.
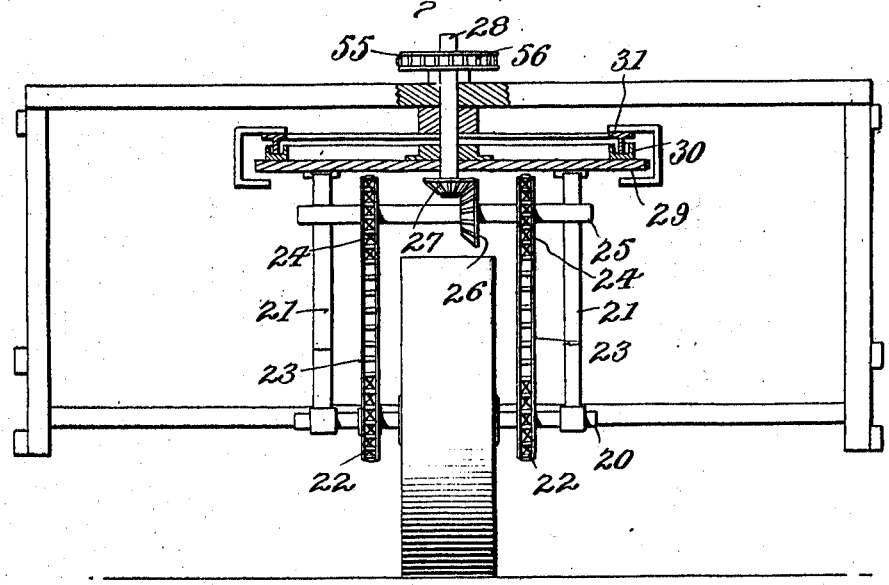
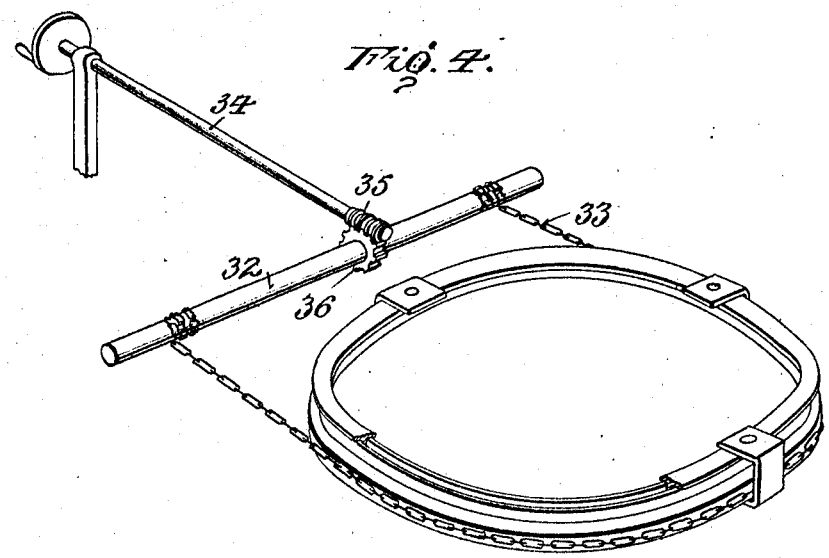
Inventor
Henry H. Boenker
Witnesses
By
Attorneys

H. H. BOENKER.
AGRICULTURAL IMPLEMENT.
APPLICATION FILED JUNE 9, 1908.

970,783.

Patented Sept. 20, 1910.
5 SHEETS—SHEET 4.

Inventor
Henry H. Boenker

Witnesses

By
Attorneys

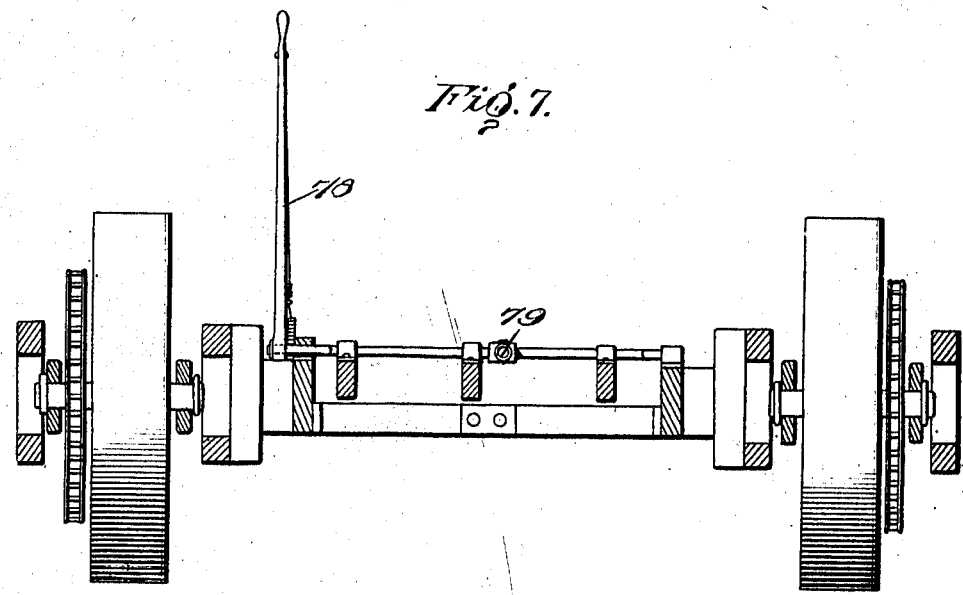
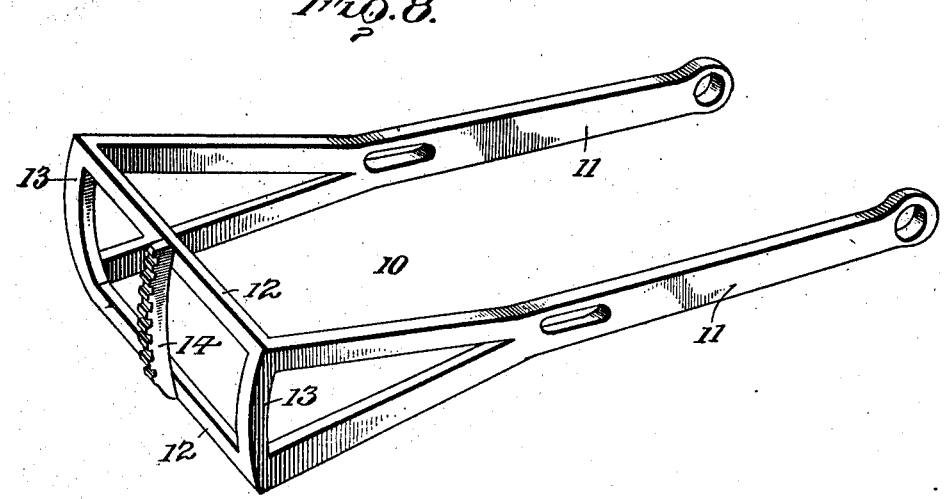

UNITED STATES PATENT OFFICE.

HENRY H. BOENKER, OF ST. CHARLES, MISSOURI.

AGRICULTURAL IMPLEMENT.

970,783.  Specification of Letters Patent.  Patented Sept. 20, 1910.

Application filed June 9, 1908. Serial No. 437,592.

*To all whom it may concern:*

Be it known that I, HENRY H. BOENKER, citizen of the United States, residing at St. Charles, in the county of St. Charles and State of Missouri, have invented certain new and useful Improvements in Agricultural Implements, of which the following is a specification.

The present invention appertains to machinery for use in the field for tilling the soil, being designed chiefly to provide an implement adapted to be mechanically propelled and which may make a short turn and is capable of being driven forward or backward without reversing the engine, the plow shovels or like device being adjustable to meet varying conditions of work and soil.

For a full understanding of the invention and the merits thereof and also to acquire a knowledge of the details of construction and the means for effecting the result, reference is to be had to the following description and accompanying drawings.

Figure 1:
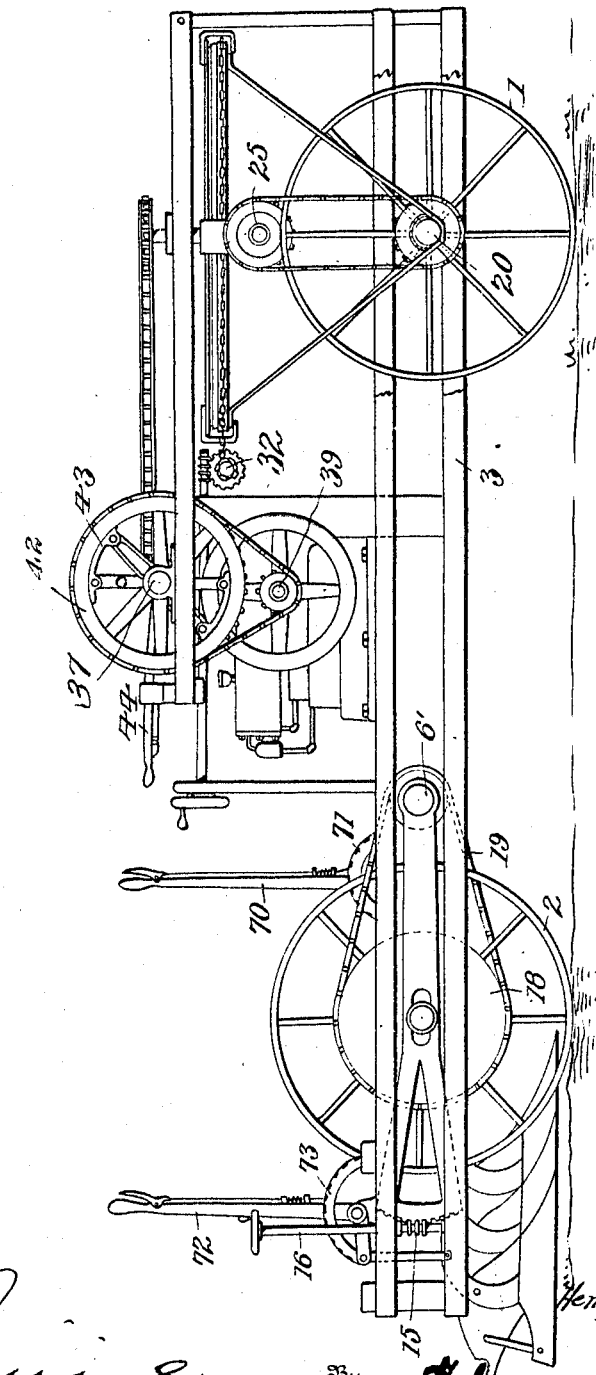
Figure 5:
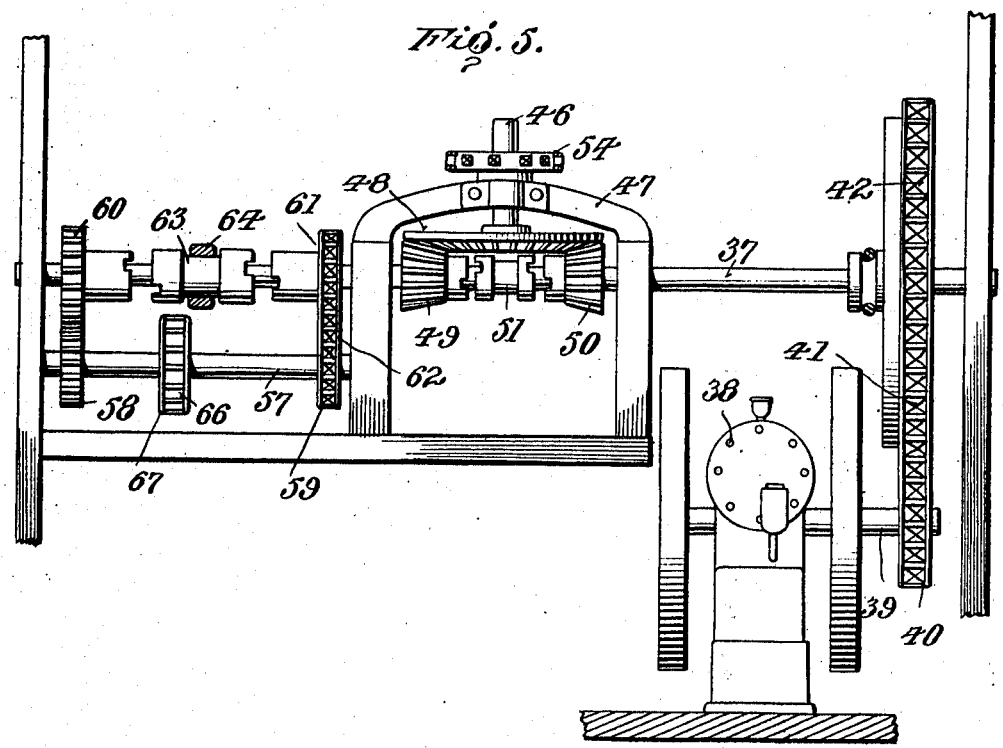
Figure 6:
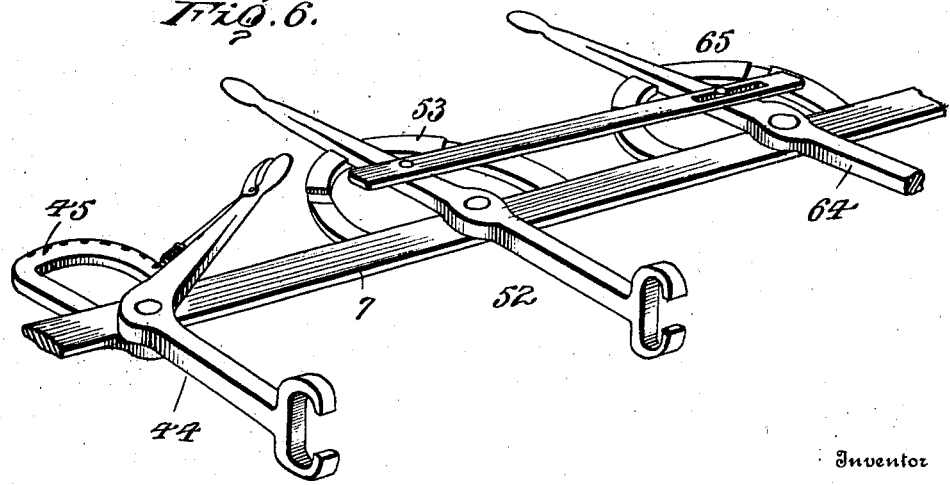

While the invention may be adapted to different forms and conditions by changes in the structure and minor details without departing from the spirit or essential features thereof, still the preferred embodiment is shown in the accompanying drawings, in which:

Figure 1 is a side view of an agricultural implement embodying the invention. Fig. 2 is a top plan view. Fig. 3 is a front view, the parts in the rear of the front axle being omitted and the fifth wheel being in section. Fig. 4 is a perspective view of the fifth wheel and steering mechanism. Fig. 5 is a transverse section on the line *x—x* of Fig. 2, looking toward the front. Fig. 6 is a detail perspective view of the several levers for throwing the operating parts into and out of gear. Fig. 7 is a transverse section on the line *y—y* of Fig. 2, looking toward the front, all in advance of the rear axle being omitted. Fig. 8 is a detail perspective view of one of the frames provided with a rear ground wheel.

Corresponding and like parts are referred to in the following description and indicated in all the views of the drawings by the same reference characters.

The machine is mounted upon three wheels shown at 1 and 2 and comprises a suitable framework upon which the operating parts are mounted. The framework comprises longitudinal bars 3, transverse connecting bars 4 and intermediate longitudinal bars 5 and other cross bars 6 and 7 connecting the longitudinal bars 5. A countershaft 6' is mounted in bearings provided in the longitudinal bars 3 and 5 and has sprocket wheels 8 and 9 fast thereto. The rear wheels 2 are mounted in frames 10 which are shown more clearly in Fig. 8. The frames 10 are mounted at their front ends upon the countershaft 6' and are adjustable at their rear ends, each frame consisting of side bars 11 and transverse connecting bars 12. The side bars 11 are forked at their rear ends, the fork members being connected by the bars 12 and by curved bars 13. A curved bar 14 connects the bars 12 and its teeth are adapted to be engaged by a worm thread 15 applied to a shaft 16. An axle 17 is supported in any suitable manner in the side bars 11 of each frame as by collars shown in Fig. 1 and a ground wheel 2 is fast to each axle, as also a sprocket wheel 18. A sprocket chain 19 connects the sprocket wheel 18 with the sprocket wheel 8 on the same side of the machine. The frames 10 turn upon the countershaft 6, hence the sprocket chains 19 maintain the same tension at all adjustments of the frames. The vertical shafts 16, for adjusting the frames 10, are mounted in bearings provided in cross pieces connecting the longitudinal bars 3 and 5. The worm 15 meshing with the teeth of the bar 14, while serving as adjusting means, also holds the frames in the adjusted position without requiring any other lock means.

The front wheel 1 is fast to an axle 20 which is mounted in bearings at the lower ends of hangers 21. Sprocket wheels 22 fast to the axle 20 are connected by sprocket chains 23 to sprocket wheels 24 fast to a transverse shaft 25, which latter has a bevel gear 26 fast thereto, said bevel gear in turn meshing with a bevel gear 27 fast to a vertical shaft 28, about which the lower member 29 of the fifth wheel turns. The shaft 28 is mounted in bearings in the upper portion of the main frame and is adapted to have motion imparted thereto from an engine mounted upon the frame. The lower member 29 of the fifth wheel is provided with a curved track 30 with which coöperates a' companion track 31, the two tracks 30 and 31 being of circular formation. A shaft 32 located in the rear of the shaft 25 is connected by means of a chain 33 with the movable member 29 of the fifth wheel, said chain 33 having its end portions reversely wound around said shaft 32 so that as one end unwinds, the other end of the chain is wound upon the shaft, with the result that the fifth wheel and front wheel 1 are turned in the desired direction. A longitudinal shaft 34 provided at its rear end with a hand wheel, has a worm gear connection with the shaft 32, being provided at its front end with a worm thread 35 which is in mesh with a worm wheel 36 fast to the shaft 32. The construction is such that the front wheel 1 may be turned at a right angle to the length of the machine with the result that a square or short turn may be made in either direction according to the direction of movement imparted to the front wheel 1.

A transverse shaft 37 is mounted in bearings applied to the longitudinal bars 5 and is adapted to be driven from an engine 38 mounted upon the framework. An engine shaft 39 is provided with a sprocket wheel 40 and a sprocket chain 41 connects the sprocket wheel 40 with a sprocket wheel 42 loose upon an end portion of the shaft 37, a friction clutch 43 being provided to secure the sprocket wheel 42 to the shaft 37, and said friction clutch being operable by means of a lever 44 which is of elbow form and mounted upon the cross bar 7 and provided with a latch bolt to coöperate with a toothed segment 45 for holding the lever in the adjusted position. Upon operating the lever 44 to throw the friction clutch out of gear, the engine may continue in motion without imparting movement to the shaft 37 or other parts geared thereto.

A vertical shaft 46 is mounted in a bearing of an arch 47 and is provided at its lower end with a bevel gear 48, which is in mesh with bevel pinions 49 and 50 loose on the shaft 37 and provided at their inner ends with half-clutches. A clutch sleeve 51 is mounted upon the shaft 37 and is keyed thereto, and is provided at its ends with half-clutches to mesh with the half-clutches at the inner ends of the bevel pinions 49 and 50. The clutch sleeve 51 is adapted to be operated by means of a lever 52 which is held in any one of three positions by means of a notched bar 53. When the clutch sleeve 51 is in an intermediate position no movement is imparted to the shaft 46, but when in either extreme position, the shaft 46 has motion imparted thereto according to which one of the pinions 49 or 50 is clutched to the shaft 37. A sprocket wheel 54 fast to the shaft 46 is connected by sprocket chain 55 to a sprocket wheel 56 fast to the upper end of shaft 28.

A shaft 57 is arranged parallel with the shaft 37 and is provided with a gear wheel 58 and a sprocket wheel 59. A gear wheel 60 loose upon the shaft 37, meshes with the gear wheel 58. A sprocket wheel 61 loose on the shaft 37 is connected by sprocket chain 62 with the sprocket wheel 59. A clutch sleeve 63 keyed to the shaft 37 and movable thereon, is adapted to make clutched engagement with either the gear wheel 60 or the sprocket wheel 61, according as the shaft 57 is to be rotated forward or to the rear. A lever 64 coöperates with the clutch sleeve 63 to shift the same and is held at an intermediate point, or at either extreme movement, by means of a notched bar 65. A sprocket wheel 66 fast to the shaft 57, is connected by sprocket chain 67 to the sprocket wheel 9 on the countershaft 6, thereby imparting motion thereto.

A frame 68 is provided at the rear end of the main frame and is vertically adjustable and is provided with the earth treating devices, such as the plows, cultivators or the like. The frame 68 is vertically adjustable at its front and its rear ends. Guides 69 are provided between the front ends of the frame 68 and the longitudinal bars 5. The guides 69 may be of any construction. A lever 70 mounted upon the main frame has connection with the front portion of the frame 68 and is provided with a latch to coöperate with a notched bar 71 to hold the lever 70 and the front end of the frame 68 in the adjusted position. Another lever 72 mounted upon the main frame has connection with the rear portion of the frame 68 and is provided with a latch coöperating with a notched bar 73 to hold said lever and the rear portion of the frame 68 in the desired position.

Transverse rods or crank shafts 74 and 75 are mounted in bearings of the side bars of the frame 68 and have beams 76 mounted thereon in parallel relation, said beams being provided with plow or cultivator shovels of any design according to the particular work. A spring 77 is connected to one of the crank shafts at one end and has its opposite end portion connected to the frame 68, said spring serving to assist in turning the crank shafts when it is required to lift the plows or cultivator shovels clear of the ground preliminary to turning the machine to recross the field. A lever 78 secured to one of the crank shafts, serves as means for operating the crank shafts to raise or lower the plow or cultivator shovels. The pitch and depth of the plow or cultivator shovels may be regulated by proper adjustment of the levers 70 and 72, which enable the frame 68 to be raised or lowered, or to be inclined to the horizontal, as may be required.

From the foregoing, it will be understood that the implement is propelled mechanically and that the driving power may be applied to the three wheels, or to the front wheel, or to the rear wheels. When the lever 52 is thrown to an intermediate position, the front wheel is thrown out of gear and the machine may be propelled by power applied solely to the rear wheels. If it be required to make a short turn, the rear wheels are thrown out of gear by operating the lever 64 and the shaft 34 is turned to bring the front wheel 1 about at a right angle to the length of the machine, after which the lever 52 is operated to clutch one or the other of the bevel pinions 49 or 50 to the shaft 37, thereby imparting rotary movement to the axle 20 and front wheel 1 through the intermediate connections herein described, thereby pulling the front portion of the machine square around and enabling the machine to be turned in its own length. The rear ground wheel 2 may be adjusted independently to adapt the machine to the surface of the ground upon which it may be operated. It is to be understood that the sprocket chain 67 is connected with the countershaft 6 by means of compensating gearing of the well known type in order to admit of the ground wheels 2 moving at unequal speeds, as when making a curve or turning to recross the field. It is also noted that the frame 68 may be provided with any number of plows or cultivators according to the size of the machine and the particular work in hand.

Having thus described the invention, what is claimed as new is:

1. In an implement of the character described, the combination of a main frame, auxiliary frames pivotally mounted on the main frame, a front wheel pivotally mounted on the main frame to turn about a vertical axis, rear wheels journaled on said auxiliary frames, means for turning the front wheel to steer the machine, an engine mounted upon the main frame, connecting means between said engine and the rear wheels including a reversing clutch mechanism for throwing said rear wheels into or out of gear, or reversing their movement, other connecting means between the front wheel and the engine including a reversing clutch mechanism for throwing said front wheel into or out of gear, or reversing the same, and means for adjusting the auxiliary frames vertically of the main frame.

2. In a machine of the character described, the combination of a main frame, auxiliary frames pivotally mounted on the main frame and provided with toothed portions, a front wheel pivotally mounted on the main frame to turn about a vertical axis, rear wheels journaled on the auxiliary frames, mountings for the front wheel including hangers, a horizontal shaft mounted in said hangers, connecting means between said shaft and the front wheel for transmitting motion thereto, a vertical shaft geared to said horizontal shaft, an engine mounted upon the main frame, a worm meshing with the teeth on each auxiliary frame for adjusting the latter vertically of the main frame, and connecting means for transmitting motion from said engine to said vertical shaft, said means including a reversing clutch mechanism, whereby the front wheel may be reversed or thrown into or out of gear.

3. In an implement of the character described, the combination of a main frame, auxiliary frames pivotally mounted on the main frame and provided with transverse slots, stub axles journaled in said slots and having rear wheels secured thereto, a front wheel pivotally mounted on the main frame and arranged to turn about a vertical axis, a fifth wheel connection between the front wheel and the framework, a vertical shaft co-incident with the axis of said fifth wheel, a second shaft geared to said vertical shaft, a countershaft, an engine mounted upon the main frame and connected with said countershaft, means for transmitting motion from the engine to the stub axles, means for raising and lowering the auxiliary frames, and gearing between said countershaft and the aforesaid second shaft, said gearing comprising a clutch mechanism for throwing the front wheel into or out of gear or reversing the movement thereof.

4. In combination, a main frame, a transverse shaft journaled on the main frame, auxiliary frames pivotally mounted on said transverse shaft, rear wheels journaled in the auxiliary frames, a front wheel mounted on the main frame to turn about a vertical axis, a countershaft, power translating means between said countershaft and the front wheel including a shaft, a gear wheel fast to said shaft, other gear wheels loose upon the countershaft and in mesh with opposite portions of said gear wheel, a clutch sleeve keyed to the countershaft and adapted to operate between the gear wheels loosely mounted thereon and to clutch either one to the shaft, an engine mounted upon the main frame, and connecting means between said engine and countershaft, a connection between the engine and transverse shaft, means for transmitting motion from the transverse shaft to the rear wheels, and means for raising and lowering the auxiliary frames.

5. In an implement of the character described, the combination with a main frame, a transverse shaft journaled on the main frame, auxiliary frames pivotally mounted on the transverse shaft at opposite sides of the main frame and disposed within the lines of the latter, stub axles journaled in the auxiliary frames and provided with rear supporting wheels, a front wheel pivotally mounted on the main frame and arranged to turn about a vertical axis, an engine supported on the main frame, means for transmitting motion from the engine to the front wheel to rotate the latter, manually operated means operatively connected with the front wheel for guiding said front wheel, means for transmitting motion from the engine to the transverse shaft and a connection between the transverse shaft and the stub axles for rotating the rear wheels of said main frame.

6. In an implement of the character described, the combination with a main frame, a transverse shaft journaled on the main frame, auxiliary frames pivotally mounted on the transverse shaft and disposed entirely within the lines of the main frame, said auxiliary frames being provided with transversely alined slots, and having their free ends provided with teeth, stub axles journaled in the slots of the auxiliary frames and carrying rear supporting wheels, a front supporting wheel pivoted on the main frame and arranged to turn about a vertical axis, an engine supported on said main frame, means for transmitting motion from the engine to the front wheel to drive the latter, sprocket chains connecting the transverse shaft and stub axles respectively, means for transmitting motion from the engine to the transverse shaft, and a vertically disposed shaft having a worm gear adapted to engage the teeth on the auxiliary frames for raising and lowering the latter.

7. In an implement of the character described, the combination with a main frame, a transverse shaft journaled on the main frame, auxiliary frames pivotally mounted on said shaft and disposed entirely within the lines of the main frame, stub axles carried by the auxiliary frames, wheels secured to the stub axles and supporting the rear portion of the main frame, a forward wheel pivotally mounted on the main frame and arranged to turn about a vertical axis, a motor supported by the main frame, means for transmitting motion from the motor to the front wheel for rotating the same, means for transmitting motion from the motor to the transverse shaft, a connection between the transverse shaft and the stub axles for rotating the rear wheels of the main frame, a stub shaft journaled on the main frame and provided with a pinion, a cable having its intermediate portion operatively connected with the forward wheel of the main frame and its opposite ends wound around the stub shaft, a hand-operated shaft having a worm engaging the pinion on the stub shaft for rotating the latter to turn the forward wheel when guiding the engine and means operatively connected with the free ends of the auxiliary frames for raising and lowering the latter.

8. In an implement of the character described, the combination with a main frame, a transverse shaft journaled on the main frame, auxiliary frames pivotally mounted on the shaft and disposed within the lines of the main frame, said auxiliary frames being provided with transversely alined longitudinal slots and terminal arcuate racks, stub axles journaled in the slots of the auxiliary frames, ground wheels secured to the stub axles for supporting the rear end of the main frame, a fifth wheel mounted for rotation at the front of the main frame, hangers depending from the fifth wheel and connected by a transverse shaft, a forward wheel mounted for rotation on the transverse shaft connecting the hangers, a motor carried by the main frame, means for transmitting motion from the motor to the transverse shaft connecting said hangers, means for transmitting motion from the engine to the transverse shaft on the main supporting frame, a connection between the last mentioned transverse shaft and the stub axles, a stub shaft having a pinion secured thereto, a chain having its intermediate portion connecting with the fifth wheel and its opposite ends wound around the stub shaft and a rod having a worm secured thereto and meshing with the teeth on the pinion for rotating the latter to operate the fifth wheel.

9. In an implement of the character described, the combination with a main frame, including spaced longitudinally disposed bars, a transverse shaft journaled on said bars, auxiliary frames pivotally mounted on the transverse shaft and disposed between the longitudinal bars and adjacent sides of the main frame, said auxiliary frames being provided with transversely alined longitudinal slots and having arcuate racks secured to the free ends thereof, stub axles journaled in said slots and provided with sprocket wheels, ground wheels mounted for rotation with the stub axles and serving to support the rear end of the main frame, sprocket wheels secured to the transverse shaft and operatively connected with the sprocket wheels on the stub axles, a front wheel pivotally mounted on the main frame and arranged to turn around a vertical axis, a motor carried by the main frame, means for transmitting motion from the motor to the front wheel, means for transmitting motion from the motor to the transverse shaft, and vertically disposed shafts having their lower portions provided with worm gears adapted to engage the teeth on the arcuate racks and their upper portions provided with finger-pieces.

In testimony whereof I affix my signature in presence of two witnesses.

HENRY H. BOENKER. [L. S.]

Witnesses:
CASPER EHRHARD,
ALWIN HACKMANN.